US007952293B2

(12) United States Patent
Kelly

(10) Patent No.: US 7,952,293 B2
(45) Date of Patent: May 31, 2011

(54) POWER FACTOR CORRECTION AND DRIVER CIRCUITS

(75) Inventor: Kevin Allan Kelly, Hilliard, OH (US)

(73) Assignee: LSI Industries, Inc., Cincinnati, OH (US)

( * ) Notice: Subject to any disclaimer, the term of this patent is extended or adjusted under 35 U.S.C. 154(b) by 390 days.

(21) Appl. No.: 12/112,101

(22) Filed: Apr. 30, 2008

(65) Prior Publication Data

US 2009/0273297 A1    Nov. 5, 2009

(51) Int. Cl.
    *H05B 37/02*    (2006.01)
(52) U.S. Cl. .................. 315/209 R; 315/247; 315/291
(58) Field of Classification Search .......... 315/209 R, 315/246, 247, 276, 283, 291, 307
    See application file for complete search history.

(56) References Cited

U.S. PATENT DOCUMENTS

| | | | |
|---|---|---|---|
| 5,247,268 A | 9/1993 | Meise | |
| 5,440,357 A | 8/1995 | Quaglia | |
| 5,612,597 A | 3/1997 | Wood | |
| 5,661,645 A | 8/1997 | Hochstein | |
| 5,754,419 A | 5/1998 | Ho | |
| 5,980,064 A | 11/1999 | Metroyanis | |
| 5,986,901 A | 11/1999 | Weng | |
| 5,999,433 A * | 12/1999 | Hua et al. ............ | 363/132 |
| 6,028,776 A | 2/2000 | Ji et al. | |
| 6,124,681 A | 9/2000 | Choi | |
| 6,150,771 A | 11/2000 | Perry | |
| 6,400,101 B1 * | 6/2002 | Biebl et al. ............ | 315/291 |
| 6,617,805 B2 | 9/2003 | Ribarich et al. | |
| 6,870,328 B2 * | 3/2005 | Tanabe et al. ............ | 315/291 |
| 6,989,807 B2 | 1/2006 | Chiang | |
| 7,054,760 B2 | 5/2006 | Youngquist | |
| 7,091,671 B2 | 8/2006 | Deurloo et al. | |
| 7,187,136 B2 | 3/2007 | Fiorello | |
| 7,256,554 B2 | 8/2007 | Lys | |
| 7,262,559 B2 | 8/2007 | Tripathi et al. | |
| 7,274,648 B2 | 9/2007 | Tanase | |

(Continued)

FOREIGN PATENT DOCUMENTS

JP        54103278        8/1979

(Continued)

OTHER PUBLICATIONS

Notification of Transmittal of The International Search Report and the Written Opinion of the International Searching Authority from related PCT Application No. PCT/US2009/042368 (18 pages).

(Continued)

*Primary Examiner* — Thuy Vinh Tran
(74) *Attorney, Agent, or Firm* — McDermott Will & Emery, LLP

(57) ABSTRACT

Power factor correction and driver circuits and stages are described. More particularly, power factor correction circuits are described that utilize an auxiliary inductor winding for power regulation. Driver circuits configured for electrical loads such as series arrangements of light emitting diodes are also described. An exemplary embodiment of a driver circuit can implement a comparator and/or a voltage regulator to allow for improved output current uniformity for high-voltage applications and loads, such as series configurations of LEDs. Embodiments of PFC stages and driver stages can be combined for use as a power supply, and may be configured on a common circuit board. Power factor correction and driver circuits can be combined with one or more lighting elements as a lighting apparatus.

24 Claims, 8 Drawing Sheets

U.S. PATENT DOCUMENTS

| | | | |
|---|---|---|---|
| 7,279,868 | B2 | 10/2007 | Lanni |
| 7,332,871 | B2 | 2/2008 | Lu |
| 7,348,735 | B2 | 3/2008 | Lestician |
| 7,358,706 | B2 | 4/2008 | Lys |
| 7,378,805 | B2 | 5/2008 | Oh et al. |
| 7,402,960 | B2 * | 7/2008 | Kajita .................. 315/291 |
| 7,501,772 | B2 | 3/2009 | Chung et al. |
| 7,511,437 | B2 | 3/2009 | Lys et al. |
| 7,528,551 | B2 | 5/2009 | Ball |
| 7,570,235 | B2 * | 8/2009 | Shaanan et al. ............ 345/82 |
| 7,609,008 | B1 | 10/2009 | Kohler |
| 7,719,246 | B2 * | 5/2010 | Melanson ................ 323/282 |
| 2004/0181358 | A1 | 9/2004 | Youngquist |
| 2004/0233145 | A1 | 11/2004 | Chiang |
| 2005/0057179 | A1 * | 3/2005 | Madhani et al. ......... 315/185 R |
| 2005/0190586 | A1 | 9/2005 | Radzinki et al. |
| 2005/0219872 | A1 | 10/2005 | Lys |
| 2005/0270770 | A1 | 12/2005 | Warrender et al. |
| 2006/0071614 | A1 | 4/2006 | Tripathi et al. |
| 2006/0214603 | A1 | 9/2006 | Oh et al. |
| 2006/0284845 | A1 | 12/2006 | Wu et al. |
| 2007/0057642 | A1 | 3/2007 | Pruett |
| 2007/0108916 | A1 | 5/2007 | Wang et al. |
| 2007/0152604 | A1 | 7/2007 | Tatsumi |
| 2007/0188114 | A1 | 8/2007 | Lys et al. |
| 2007/0188457 | A1 | 8/2007 | Wu et al. |
| 2007/0195532 | A1 * | 8/2007 | Reisenauer et al. ......... 362/294 |
| 2007/0285030 | A1 | 12/2007 | Okamoto et al. |
| 2008/0018261 | A1 | 1/2008 | Kastner |
| 2008/0093999 | A1 | 4/2008 | Cheng et al. |
| 2008/0157686 | A1 | 7/2008 | Chung et al. |
| 2008/0203932 | A1 | 8/2008 | Ball |
| 2008/0224629 | A1 | 9/2008 | Melanson |
| 2008/0224636 | A1 | 9/2008 | Melanson |
| 2008/0278092 | A1 | 11/2008 | Lys et al. |
| 2009/0051296 | A1 | 2/2009 | Ball |
| 2009/0146575 | A1 | 6/2009 | Chu et al. |

FOREIGN PATENT DOCUMENTS

| | | |
|---|---|---|
| WO | WO 01/48495 | 7/2001 |

OTHER PUBLICATIONS

NCP1606 Cost Effective Power Factor Controller, Semiconductor Components Industries, LLC, Jun. 2007, Rev. 4, http://onsemi.com, 22 pages.

Schematic for the NCP1606B BOOST Evaluation Board, ON Semiconductor, Feb. 2, 2007, 1 page.

160W PFC Evaluation Board with DCM PFC controller TDA4863-2 and CoolMOS SPP08N50C3, Power Management & Supply, Application Note Version 1.0, Infineon Technologies, Apr. 2004, 24 pages.

L6562-80W high performance transition mode PFC evaluation board, www.st.com, Nov. 2006, 6 pages.

TL331 Singe Differential Comparator, SLVS238E, Aug. 1999, revised Sep. 2004, Texas Instruments, 9 pages.

TL431, TL431A, TL431B, TL432, TL432A, TL432B Adjustable Precision Shunt Regulators, SLVS543J, Aug. 2004—revised Dec. 2005, Texas Instruments, 68 pages.

Invitational to Pay Additional Fees And, Where Applicable, Protest Fee, dated Sep. 21, 2009, (4 pages).

Office Action dated Dec. 8, 2010 from corresponding Australian Application No. 2009242665.

* cited by examiner

POWER FACTOR CORRECTION AND DRIVER CIRCUITS

FIELD OF THE DISCLOSURE

The present disclosure relates generally to power factor correction and driver circuits. More particularly, the present disclosure relates to power factor correction circuits utilizing an auxiliary inductor winding for power regulation and also high-voltage driver circuits configured for electrical loads such as series arrangements of light emitting diodes ("LEDs").

BACKGROUND OF THE DISCLOSURE

Power factor is the ratio of real power to apparent power. In the United States, power is provided at approximately 120 Volts AC with a frequency of approximately 60 Hertz. In Europe and other areas, power is provided at approximately 240 Volts AC with a frequency of approximately 50 Hertz.

Power factor correction (PFC) is the process of adjusting the characteristics of electric loads that create a power factor less than 1. Power factor correction may be applied either by an electrical power transmission utility to improve the stability and efficiency of the transmission network. Or, power factor correction may be installed by individual electrical customers to reduce the costs charged to them by their electricity supplier. A high power factor (i.e., close to unity, or "1") is generally desirable in a transmission system to reduce transmission losses and improve voltage regulation at the load.

Electrical loads consuming alternating current power consume both real power, which does or is able to do useful work, and reactive power, which dissipates no energy in the load and which returns to the source on each alternating current cycle. The vector sum of real and reactive power is the apparent power. The ratio of real power to apparent power is the power factor, a number between 0 and 1 inclusive. The presence of reactive power causes the real power to be less than the apparent power, and so, the electric load has a power factor of less than unity.

The reactive power increases the current flowing between the power source and the load, which increases the power losses through transmission and distribution lines. This results in additional costs for power companies. Therefore, power companies require their customers, especially those with large loads, to maintain their power factors above a specified amount (usually 0.90 or higher) or be subject to additional charges. Electricity utilities measure reactive power used by high demand customers and charge higher rates accordingly. Some consumers install power factor correction schemes at their factories to cut down on these higher costs.

Electrical engineers involved with the generation, transmission, distribution and consumption of electrical power have an interest in the power factor of loads because power factors affect efficiencies and costs for both the electrical power industry and the consumers. In addition to the increased operating costs, reactive power can require the use of wiring, switches, circuit breakers, transformers and transmission lines with higher current capacities.

Power factor correction brings the power factor of an AC power circuit closer to 1 by supplying reactive power of opposite sign, adding capacitors or inductors which act to cancel the inductive or capacitive effects of the load, respectively. For example, the inductive effect of motor loads may be offset by locally connected capacitors. Sometimes, when the power factor is leading due to capacitive loading, inductors are used to correct the power factor. In the electricity industry, inductors are said to consume reactive power and capacitors are said to supply it, even though the reactive power is actually just moving back and forth between each AC cycle.

Instead of using a capacitor, it is possible to use an unloaded synchronous motor. The reactive power drawn by the synchronous motor is a function of its field excitation. This is referred to as a synchronous condenser. Such a condenser is started and connected to the electrical network. It operates at full leading power factor and puts reactive power (commonly referred to as Volt-Amps Reactive or "VARs") onto the network as required to support a voltage of a system or to maintain the system power factor at a specified level. The installation and operation of a condenser are identical to large electric motors. Its principal advantage is the ease with which the amount of correction can be adjusted, as it behaves like an electrically variable capacitor.

Non-linear loads create harmonic currents in addition to the original AC current. Addition of linear components such as capacitors and inductors cannot cancel these harmonic currents, so other methods such as filters or active power factor correction are required to smooth out their current demand over each cycle of alternating current and so reduce the generated harmonic currents.

A typical switched-mode power supply first rectifies a AC current, forming a DC bus (or DC ripple current) using a bridge rectifier or similar circuit. The output voltage is then derived from this DC bus. The problem with this is that the rectifier is a non-linear device, so the input current is highly non-linear. That means that the input current has energy at harmonics of the frequency of the voltage.

This presents a particular problem for the power companies, because they cannot compensate for the harmonic current by adding simple capacitors or inductors, as they could for the reactive power drawn by a linear load. Many jurisdictions are beginning to legally require power factor correction for all power supplies above a certain power level.

FIG. 1 illustrates the current and voltage waveforms for an electronic device that power factor correction (PFC) is designed to correct according to the prior art. As illustrated, the voltage waveform is sinusoidal in shape and the current waveform can be characterized as a waveform with a steady current value with large spikes in the amplitude of the current waveform along with a high content of harmonics. The large spikes in the current waveform are caused because of the switching power supply and its use of the rectifier bridge/smoothing capacitor circuits. From an efficiency viewpoint, a typical uncorrected switched-mode power supply has a power factor of 0.6, which effectively reduces the current available from the AC socket from about 13 to about 7.8 Amps.

A solution for power factor correction is to condition the equipment's input load power so that it appears purely resistive using active PFC techniques. Common PFC designs employ a boost preconverter ahead of the conventional voltage-regulation stage, which effectively cascades to switched-mode power supplies. The boost preconverter raises the full-wave rectified, unfiltered AC line to a DC input rail at a level slightly above the rectified AC line, can be around 375 to 400 volts DC. By drawing current throughout the AC line cycle, the boost preconverter forces the load to draw current in phase with AC line voltage, quashing harmonic emissions.

The simplest way to control the harmonic current is to use a filter as a passive power factor correction technique. It is possible to design a filter that passes current only at line frequency (e.g., 50 or 60 Hz). This filter reduces the harmonic current, which means that the non-linear device now looks like a linear load. At this point the power factor can be brought to near unity, using capacitors or inductors as required. This filter requires large-value high-current inductors, however, which are bulky and expensive. This is a simple way of correcting the nonlinearity of a load by using capacitor banks. It is not as effective as active PFC. Switching the capacitors into or out of the circuit causes harmonics, which is why active PFC or a synchronous motor is preferred.

It is also possible to perform active power factor correction. For such, a boost converter is commonly inserted between the bridge rectifier and the main input capacitors. The boost converter attempts to maintain a constant DC bus voltage on its output while drawing a current that is always in phase with and at the same frequency as the line voltage. Another switch mode converter inside the power supply produces the desired output voltage from the DC bus. This approach requires additional semiconductor switches and control electronics, but permits cheaper and smaller passive components. Due to their very wide input voltage range, many power supplies with active PFC can automatically adjust to operate on AC power from about 100 V (Japan) to 240 V (UK).

An Active Power Factor Corrector (active PFC) is a power electronic system that controls the amount of power drawn by a load in order to obtain a Power Factor value as close as possible to unity. In most applications, the active PFC controls the input current of the load so that the current waveform is proportional to the mains voltage waveform (a sine wave). Some types of active PFC are (i) Boost, (ii) Buck, and (iii) Buck-Boost Active power factor correctors can be single-stage or multi-stage. Active PFC can produce a PFC of 0.99 (99%).

Power supplies that utilize rectifier-bridge/smoothing capacitor circuits draw non-sinusoidal currents as the instantaneous voltage of the AC line exceeds the voltage of the storage capacitor. The electricity generator, with no power factor correction, must supply energy at the top/peak of the sine wave rather than throughout the cycle, which can cause the sine wave to collapse around its peak.

FIG. 2 illustrates a power factor correction circuit with a boost preconverter according to the prior art. The full-wave bridge rectifier 200 receives the AC input voltage and produces a full-wave rectified voltage. The boost preconverter 205 receives the full-wave rectified voltage and forces the load to draw current in phase with the voltage. The shape of the current waveform is determined by a switching device 215, which is coupled to the output and a control circuit 220. The control circuit 220 provides an input to the switching device 215 and receives as input signals a signal from the output and a signal from the rectifier/boost node 225. This circuit may solve the power factor problem by shaping the current waveform to mimic the voltage waveform and to cause the current waveform to be in phase with the voltage waveform.

For some applications, including those providing power at relatively high voltages, such previously described PFC techniques can present or allow for undesirable losses in efficiency due to non unity PFC values.

Increasingly, many industrial, commercial, and public infrastructure applications have utilized light emitting diodes for lighting. Compared with previous lighting techniques such as incandescent or fluorescent lighting, LEDs can provide, a broad color spectrum, compact size, increased energy efficiency, absence of mercury and related environmental concerns, increased operating life, ability to dim output, absence of infrared or ultraviolet spectral components (when desired), and low voltage (on a per LED basis). LEDs are inherently low voltage devices and depending on color and current, the forward voltage of the LED can vary from less than 2 to 4.5 V. In addition, LEDs need to be driven with a constant current to ensure the intensity and color desired. Regarding driver stages for electrical components such as various types of lighting, including LEDs, regulators have been used for power regulation and power factor correction. Such regulators and PFC techniques, however, have been shown to have less than optimal current control. This in turn can lead to unacceptable variation in current delivery, with attendant component longevity reductions and thermal management issues.

What is currently lacking, therefore, are techniques for providing power factor correction values closer to unity under a variety of operating condition and for relatively high voltages. What is further lacking are techniques for providing relatively high voltages for electrical components with increased and more uniform power regulation, particularly for lighting applications, including LED applications, where variations in applied power can produce noticeable visual effects.

SUMMARY

The present disclosure is directed to and includes techniques and systems, including circuitry, for providing power factor correction values near unity under a variety of operating conditions and for relatively high voltages, e.g., at about or over 400V. The techniques and systems, including circuitry, described in the present disclosure can provide relatively high voltages for electrical components with increased and more uniform power and current regulation.

Exemplary embodiments can be utilized or implemented for operation and control of configurations of LEDs, e.g., series configurations of a desired number of suitable LEDs.

One aspect of the present disclosure includes techniques and systems, including circuits, circuitry, and/or stages, providing power factor correction. More particularly, an aspect of the present disclosure relates to and can provide power factor correction circuits utilizing an auxiliary inductor winding for power regulation and current phase (e.g., zero point) detection.

A further aspect of the present disclosure relates to and can provide high-voltage driver circuits configured for electrical loads such as series arrangements of LEDs. An exemplary embodiment of such a drive stage or circuit can implement a comparator and/or a voltage regulator to allow for improved output current uniformity for high-voltage applications and loads, such as series configurations of LEDs.

Exemplary embodiments of PFC stages/circuit and driver stages/circuits can be configured and arranged in a combined circuit. Such embodiments can be utilized as power supplies and may be configured on or with a common circuit board, e.g., on opposing sides of a common circuit board.

Other aspects, embodiments, and details of the of present disclosure will be apparent from the following description when read together with the accompanying drawings.

BRIEF DESCRIPTION OF THE DRAWINGS

Aspects and embodiments of the present disclosure may be more fully understood from the following description when read together with the accompanying drawings, which are to be regarded as illustrative in nature, and not as limiting. The drawings are not necessarily to scale, emphasis instead being placed on the principles of the disclosure. In the drawings.

Figure 1:
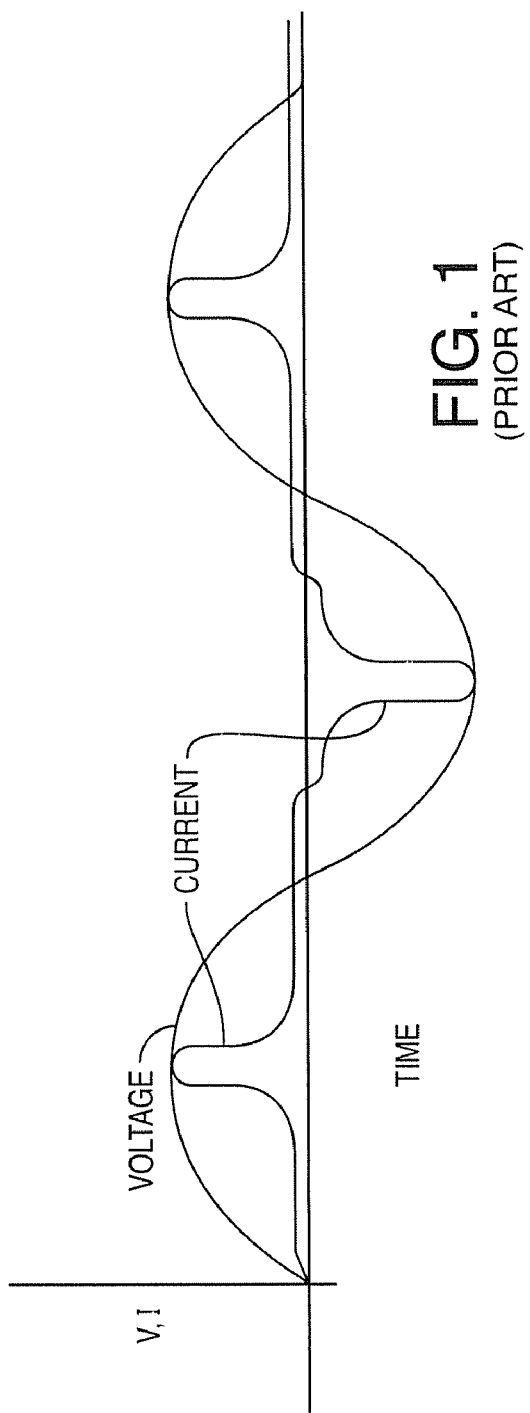
FIG. 1 illustrates the current and voltage waveforms for an electronic device for which prior art PFC techniques have been used.
Figure 2:
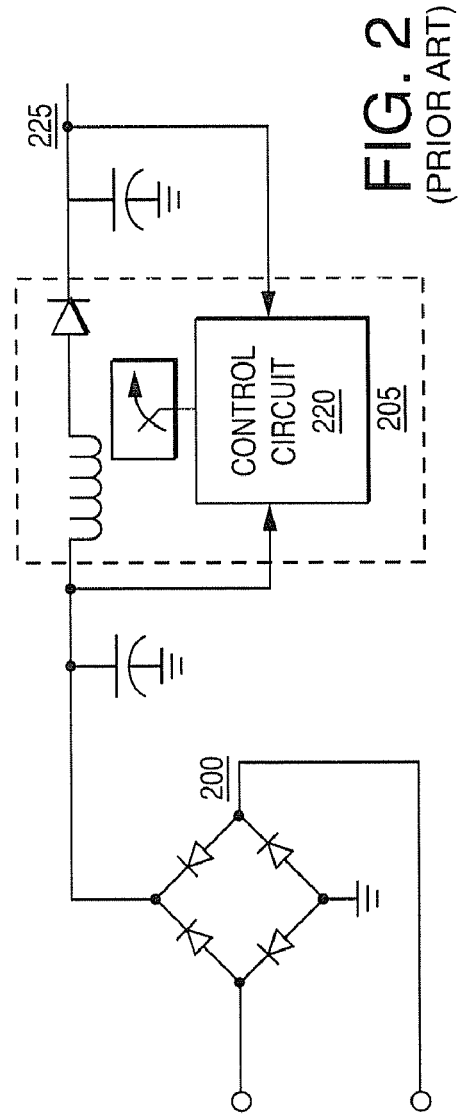
FIG. 2 depicts a prior art PFC control circuit.

While certain embodiments are depicted in the drawings, the embodiments depicted are illustrative and variations of those shown, as well as other embodiments described herein, may be envisioned and practiced within the scope of the present disclosure.

Moreover, one skilled in the art will also appreciate that while certain component values and/or part/model numbers are shown in the drawing that other suitable parts/components with other suitable values may be used within the scope of the present disclosure.

DETAILED DESCRIPTION

Aspects and embodiments of the present disclosure provide circuits/stages that can be utilized for power factor correction and/or electric device/component driver functionality. Such stages or circuits can be used to increase power factor correction and/or power regulation and improve service life of electrical loads, e.g., series configurations of LEDs and related components, as well as reduce thermal losses and costs related to such.

A further aspect of the present disclosure relates high-voltage driver circuits configured for electrical loads such as series arrangements of light emitting diodes. An exemplary embodiment of a drive circuit can implement a comparator and/or a voltage regulator to allow for improved output current uniformity for high-voltage applications and loads, such as series configurations of LEDs.

Aspects and embodiments of the present disclosure may be more fully understood from the description herein when read together with the accompanying drawings, which are to be regarded as illustrative in nature, and not as limiting. In the drawings, prominent features of the depicted circuit embodiments are provided with reference characters (e.g., capacitor 336 in FIG. 3B) and called out in the related description while other less prominent features do not have such character references in the drawings or call outs in the description; in the drawings described in this detailed description, however, functional components of the depicted circuit are provided with representative applied voltage inputs and ground symbols as well as circuit element symbols and letters (according to conventional standards), in addition to representative ratings, pin numbers, and/or values (e.g., electrolytic capacitor C1 with nominal capacitance of 68 µF rated for 450 V shown in FIG. 3B) for ease of comprehension. One skilled in the art will appreciate that, while certain component values and/or part/model numbers are shown in the drawing, other suitable parts/components with other suitable values may be used within the scope of the present disclosure.

One aspect of the present disclosure relates to PFC circuits utilizing an auxiliary inductor winding for power regulation and/or current phase (e.g., zero point) detection. One example of such a PFC circuit is shown in FIGS. 3A-B.

Figure 3A:
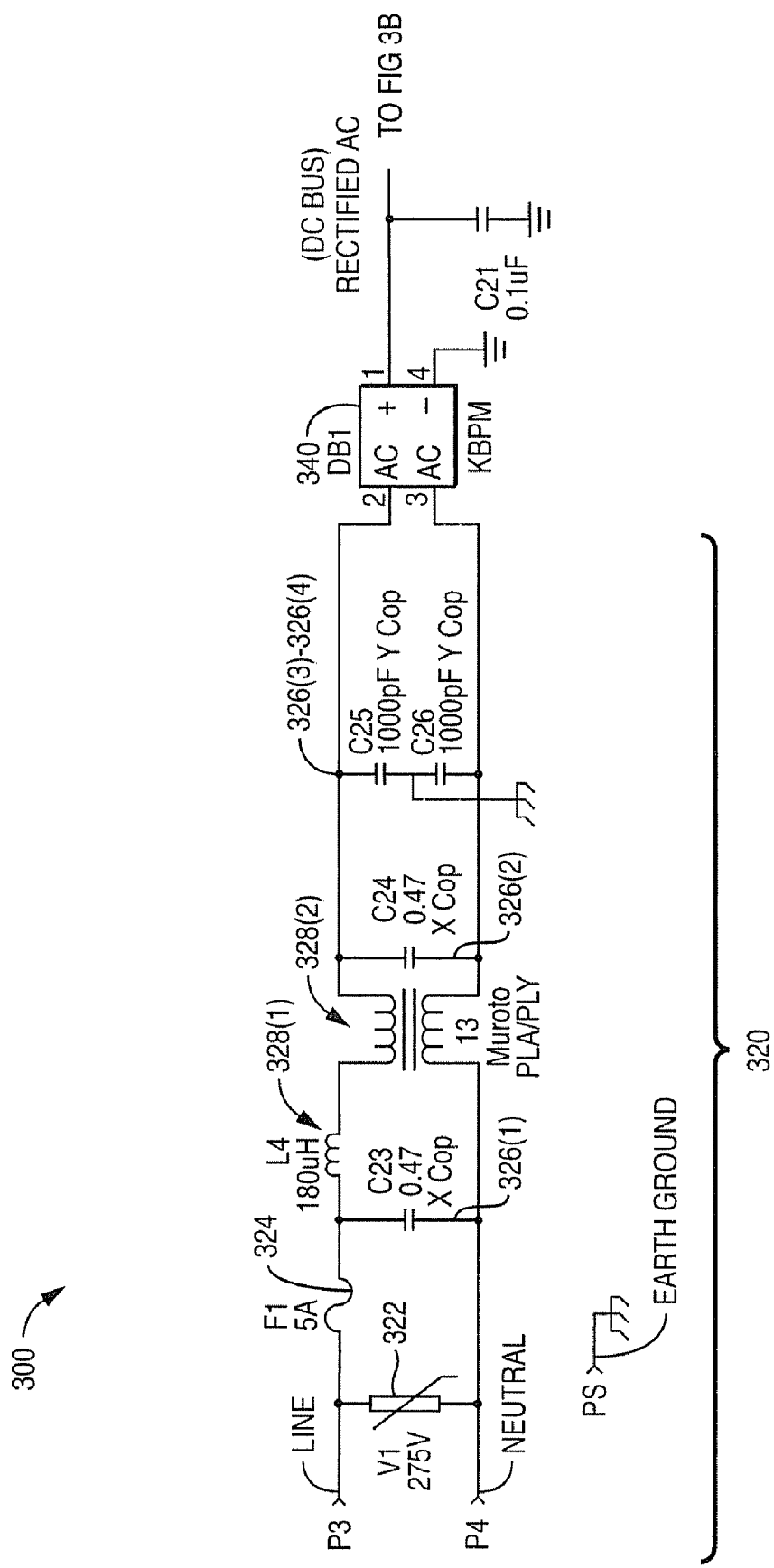
FIGS. 3A-B depict a circuit diagram of a PFC circuit, in accordance with an exemplary embodiment of the present disclosure.
Figure 3B:
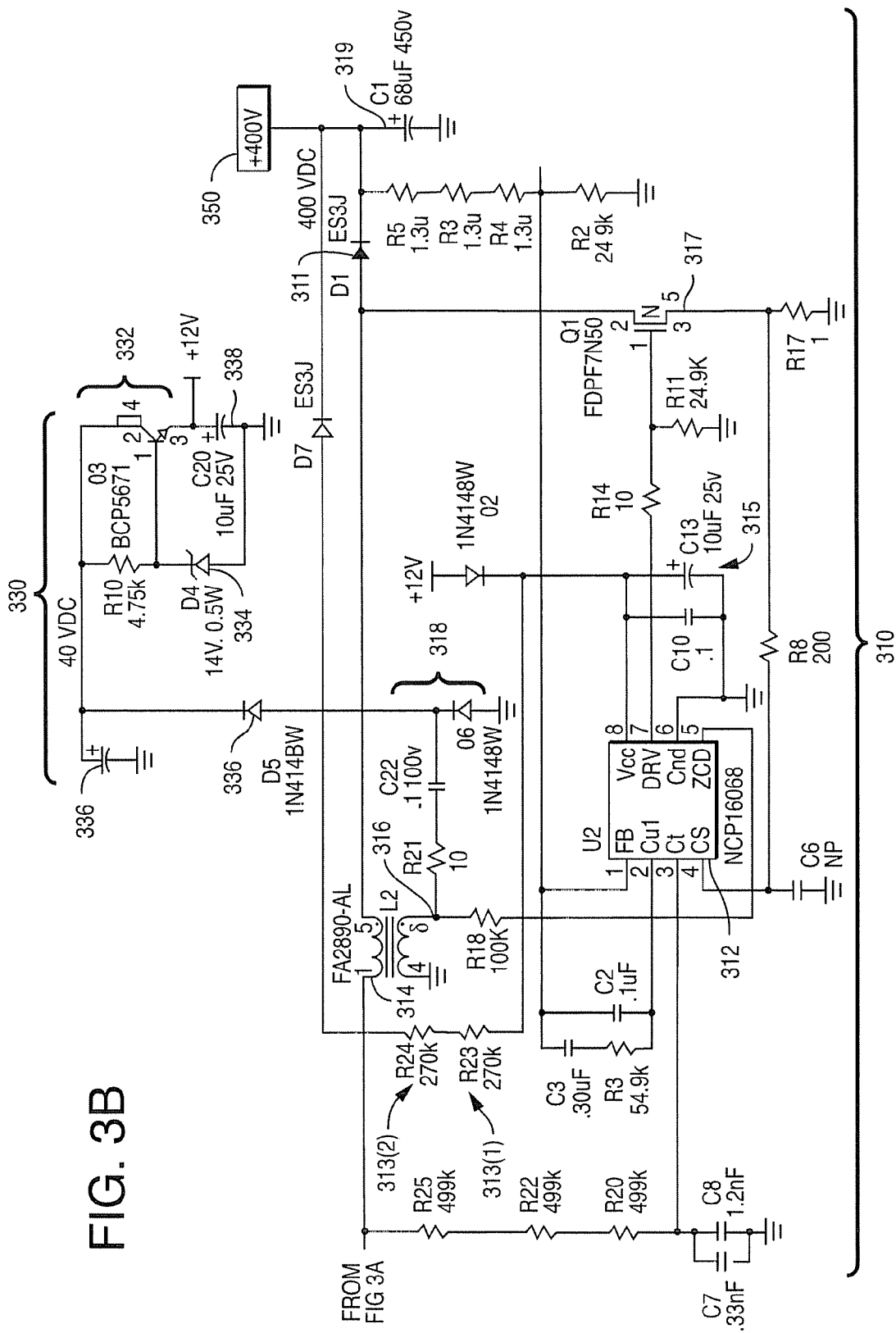

FIGS. 3A-B depict a circuit diagram of a PFC circuit or stage 300, in accordance with an exemplary embodiment of the present disclosure.

As shown FIGS. 3A-B, the power factor correction stage 300 can include a boost circuit 310 (e.g., configured in a boost preconverter topology or circuit portion) connected to a EMI filter portion 320. The EMI filter 320 can be configured to receive AC power, such as supplied by a typical 120 Volt AC source with a line, neutral, and earth ground, as shown. The boost circuit 310 can include an active power factor correction controller 312. The stage 300 can also include a power regulator circuit 330 and a rectifier 340. In exemplary applications and implementations, the PFC stage 300 can be configured for operation in critical conduction mode (CRM).

The boost circuit 310 can also include a boost or PFC coil 314 with an auxiliary winding 316. A voltage regulation circuit or regulator 330 may be included in the PFC stage 300 so as to regulate voltage from the auxiliary winding 316 to a desired voltage for use by the power factor controller 310 and/or other circuitry/components, e.g., a driver controller as shown and described for FIGS. 4A-B. A rectifier 340 can be included in PFC stage 300 and may configured and arranged as shown to receive AC from the EMI filter circuit 320, for facilitating/producing a rectified voltage and current for the boost circuit 310. In exemplary embodiments, a NCP1606B controller may be used for power factor controller 310. The maximum voltage applied to any pin of a NCP1606 controller can be limited to 20V or less for certain applications. In exemplary embodiments, the boost coil 314 can be a FA2890-AL PFC Boost Inductor as made commercially available by Coilcraft, Inc.

With continued reference to FIG. 3B, the EMI filter circuit 310 can include a varistor 322, fuse 324, multiple capacitors 326(1)-326(4), and one or more coils/inductors 328(1)-328(2) for EMI shielding/filtering as shown.

The PFC controller 312 (e.g., a NCP1606 controller configured as shown in FIG. 3B) determines the correct off time by sensing the inductor voltage. When the inductor current drops to zero, the drain voltage of the transistor switch 317 (shown for an exemplary embodiment as Q1 550 V N-Channel enhancement mode MOSFET FDPF7N50 as made commercially available by Fairchild Semiconductor Corporation) is essentially floating and can begin to drop. If the switch 317 is turned on at this moment, then CRM operation will be achieved. To measure this high voltage directly on the boost inductor is generally not economical or practical. Rather, a smaller auxiliary winding 316 is taken off the boost inductor 314. This winding 316 can operate as a zero current detector (ZCD) winding (e.g., as shown connected to pin 8 of controller 312), and can function, among other things, to give a scaled version of the inductor 314 output for use by the PFC controller 312.

As described, a primary use of the auxiliary coil winding 316 of PFC stage 300 is to allow the PFC controller (e.g., a NCP1606 IC. in exemplary embodiments) to determine when the current of the PFC inductor 314 reaches a particular phase point, e.g., when a zero crossing of the current in the PFC inductor occurs 314. For CRM operation, while the on time is constant across the AC cycle, the off time in CRM operation varies with the instantaneous input voltage.

Figure 4A:
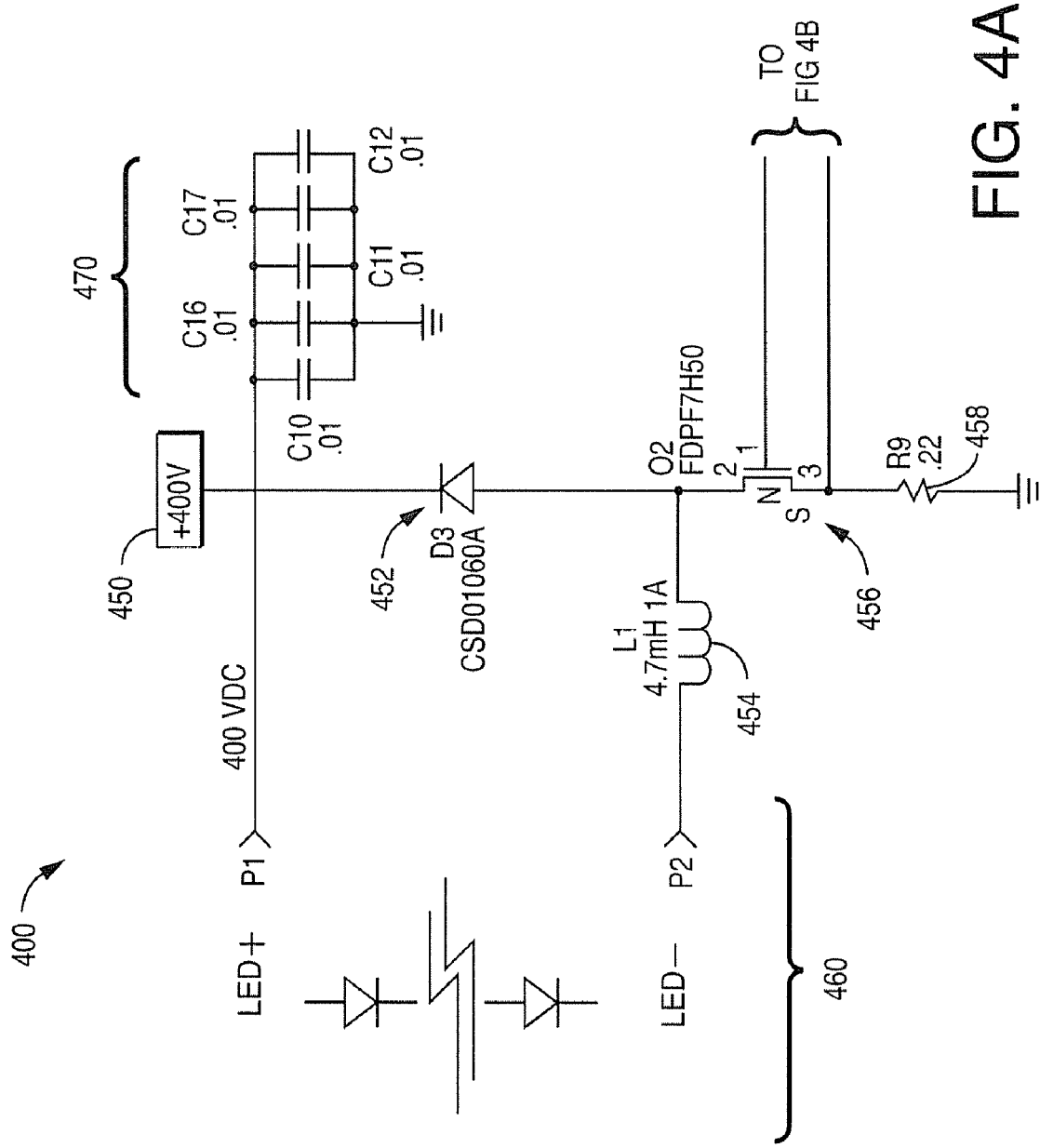
FIGS. 4A-B depict a circuit diagram of a driver circuit, in accordance with an exemplary embodiment of the present disclosure.
Figure 4B:
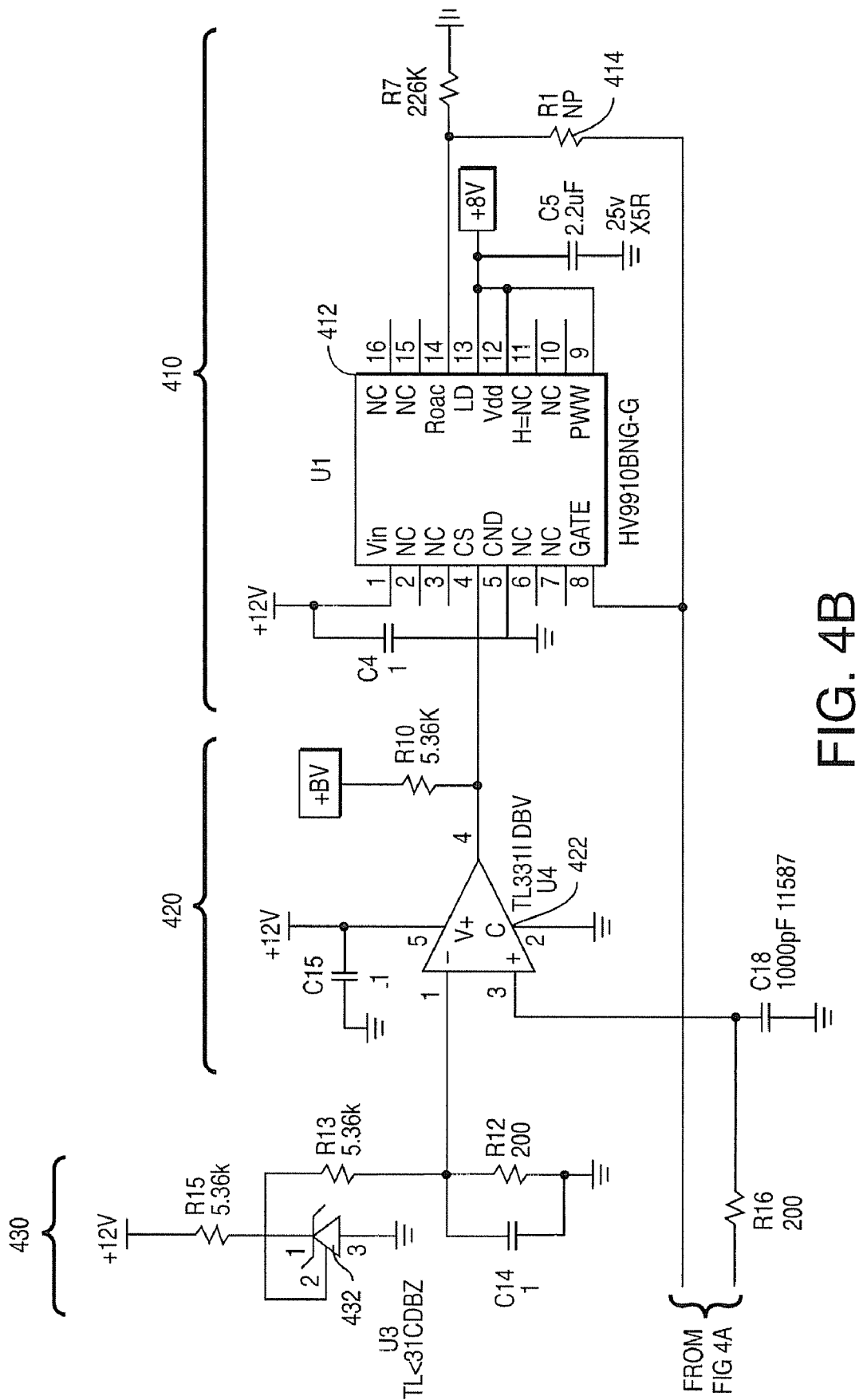

In addition to zero-current detection, the auxiliary coil winding 316 can also provide the power needed to run the PFC controller 312, e.g., a NCP1606 controller and/or related/connected components and circuitry, e.g., a driver controller such as the Supertex HV9910 shown and described for FIGS. 4A-B.

In the operation of the PFC stage 300, the PFC controller 312 (e.g., NCP1606) is inactive when the circuit 300 is first powered up. Upon power up, a small trickle of current would begin to flow through resistors 313(1) and 313(2), which for an exemplary embodiment may have resistance values of 270 k ohms as shown for R24 and R23 in FIG. 3B. This current produced charges up capacitor 315, e.g., which can be a electrolytic capacitor with value of 10 µF at 25 V as shown by C13 in FIG. 3B. When the voltage on the capacitor 315 reaches the on voltage Vcc(on) for the PFC controller 312, the PFC controller 312 can start up and turn on the transistor switch 317 (shown for an exemplary embodiment as Q1 550 V N-channel MOSFET FDPF7N50 as made commercially available by Fairchild Semiconductor Corporation). This causes the current in PFC inductor 314 (shown for an exemplary embodiment as L2 part number FA2890-AL as made commercially available by Coilcraft, Inc.) and the auxiliary winding 316 to ramp up.

The voltage regulator circuit (or regulator) 330 of the PFC stage 300 can include a common emitter amplifier 332, a Zener diode 334, a storage capacitor 336, and a local capacitor 338, which can be connected to the auxiliary winding 316 of the coil 314, e.g., by way of a diode 339 and the charge pump 318. The common emitter amplifier 332 can include a NPN transistor, as shown. In exemplary embodiments, the NPN transistor can be a BCP56 model number transistor with a rating of 80 $V_{CEMAX}$, the storage capacitor 336 can be a 47 µF electrolytic capacitor rated for 53 V, and the local capacitor 338 can be a 10 µF capacitor rated for 25 V, as shown in FIG. 3B.

The voltage regulator 330 of the PFC stage 300 can operate to regulate voltage from the auxiliary winding 316 to a desired level, e.g., from 40 v supplied by the auxiliary winding down to 12 v as needed by a power factor correction controller 312. Such regulation can be desirable for many applications, as the voltage on capacitor 336 (e.g., which might, as shown, be 40V on C9 for exemplary embodiments) may be too large a voltage for application to inexpensive off the shelf linear regulators, e.g., a LM7812 regulator, or else too close to the maximum rating of such regulators to meet a sufficient or desired factor of safety.

In operation of stage 300, after the constant ON time expires for PFC controller (e.g., during CRM operation), switch 317 is turned off and the energy collected in the PFC inductor 314 is transferred through a diode 311 to capacitor 319, e.g., depicted in FIG. 3B as Cl, an electrolytic capacitor of 68 µF as maximum voltage of 450 V, for the 400 V output 350. When the PFC inductor current ramps down to zero (which is detected in the auxiliary winding 316), the PFC controller 312 turns on the switch 317 (e.g., transistor switch Q1) for the constant on time and the process starts again. The constant on time means that the current in the PFC inductor 314 will reach a higher value if the input voltage is higher and will be lower if the input voltage is lower. Thus the input current pulses are tied to the input voltage and the Power Factor provided by PFC stage 300 is high (approaches unity).

As described previously, the auxiliary winding 316 can be used to supply power to operate the PFC controller 312 (e.g., NCP1606) and/or connected components (e.g., driver controller 412 of FIG. 4B). In this role, the AC (or AC component) output of the auxiliary winding 316 is preferably converted to DC and smoothed out. A charge pump 318 (e.g., including R21, C22 and D6 as shown in FIG. 3B) can be connected to the auxiliary winding 316 of the PFC inductor 314. The voltage on the storage capacitor 336 is one diode drop below the voltage supplied from the auxiliary winding 316. For example, assuming a nominal voltage of 400 V through inductor 314 and a 10:1 winding ratio, the auxiliary winding 316 would have a voltage of 40 V (before the drop across the resistor and capacitor of the charge pump 318).

Continuing with the description of the regulator circuit 330, the higher voltage (compared to prior art techniques) and the fact that the storage capacitor 336 can be designed to have a desired capacitance, e.g., 68 µF, 47 µF, 39 µF, etc. can allow for sufficient energy being stored to be available to feed the PFC controller 312 and/or other circuitry components (e.g., a controller 412 as shown and described for FIG. 4B) at times when the PFC switching shuts down due to an over-voltage condition on the output. In the absence of the energy supplied/available from capacitor 336, a user could otherwise notice an over-voltage condition, e.g., as a flash of the lights when the electrical load is an LED string, if the energy in capacitor 336 was insufficient to feed the parts/load (strings of LEDs) thru the PFC off time.

In addition to PFC circuits, the present disclosure presents other aspects, including driver circuits or stages that are configured and arranged to provide electrical loads with a relatively high voltage, e.g., 400 V DC, and with high uniformity of current. FIGS. 4A-B depict a circuit diagram of one such driver circuit or stage 400, in accordance with an exemplary embodiment of the present disclosure.

Referring to FIGS. 4A-B, the driver stage 400 can include a driver control topology or circuit 410, a comparator circuit 420, and a voltage reference/regulator circuit 430. The driver stage 400 may be configured and arranged to regulate power received at an input 450 for application to an electrical load 460. The voltage at the input 450 may at a relative high voltage, e.g., at or above 400 V DC, or over a range of such voltages, e.g., from about 400 V DC to about 500 V DC, etc. In exemplary embodiments, the driver stage 400 can be coupled to an electrical load that includes a series configuration of LEDs, such as indicated in FIGS. 4A-B. The driver stage 400 may also include a capacitor bank 470 as shown.

The driver control circuit 410 can include a driver integrated circuit ("IC") or controller 412. The comparator circuit 420 can include a suitable comparator 422. The regulator circuit 430 can include a suitable regulator (or shunt regulator) 432 in a regulator configuration as shown. Applications of driver circuit 400 can utilize a PWM high-efficiency LED driver control IC for controller 412. In exemplary embodiments, a HV9910BNG-G LED driver IC as made commercially available by Supertex, Inc. may be used for driver controller 412. In exemplary embodiments, a TL331IDBV single differential comparator as made available by Texas Instruments Inc. can be used for the comparator 422. And, in exemplary embodiments, a TL431CDBZ shunt regulator as made available by Texas Instruments Inc. (or equivalent) can be used for the regulator 432 in the regulator circuit 430.

With continued reference to FIG. 4A, the driver stage 400 can include a diode or flyback diode 452, e.g., as shown configured between input 450 and the drain of switch 456, which can be a MOSFET configured as a switch. The flyback diode 452 can provide a return path for the load/inductor current (current through the load and/or inductor) during the switch (e.g., MOSFET) off time. When controller 412 turns on MOSFET 456, current flows through LED load 460 and inductor 454. When controller 412 turns off MOSFET 456 the energy stored in the inductor 454 during the on time causes current to continue to flow in the load 460 and inductor 454. This current forward biases flyback diode 452 closing the loop. In exemplary embodiments, the diode 452 can be a silicon carbide (SiC) Schottky diode, e.g., a CSD01060A as made commercially available by Cree, Inc. Such configurations can facilitate longevity of the device(s)/component(s) forming the load for driver 400.

In exemplary embodiment, stage 400 is configured to receive an input voltage of about 400 V DC, e.g., as supplied by PFC stage 300 of FIGS. 3A-B, and may be used for supplying regulated power to desired electrical loads. Stage 400 may operate at 100KHz at 0.425 Amps in exemplary embodiments. In exemplary embodiments, driver stage 400 may be utilized to supply current to series configurations of LEDs. Stage 400 can operate to supply current at a desired current rating, e.g., 350 mA, with ±3-4%. In contrast, prior art techniques have supplied current at similar voltages to electrical loads at a precision of only ±20%.

With continued reference to FIGS. 4A-B, in operation, the driver controller 412 (e.g., HV9910 IC designated U1 in FIG. 4B) can start a pulse width modulation ("PWM") cycle by turning on transistor switch 452 (e.g., transistor Q2 with part number 550 V N-Channel enhancement mode MOSFET FDPF7N50 as made commercially available by Fairchild Semiconductor Corporation). At this point, current provided by the PFC supply 450 (e.g., supplying 400 V DC) would then flow through the load 460 (e.g., LEDs) and then thru the inductor 454, switch 456, and resistor 458 to ground. The current consequently would ramp up until the +input of comparator 422 is higher than the −input at which time the comparator output would go high and thereby drive the controller (CS) input, causing the controller 412 to turn switch 456 off. After an off time (e.g., as determined by the value of R7 connected to pin 14 designated $R_{osc}$), the cycle could then be repeated.

With continued reference to FIGS. 4A-B, driver circuit 400 can offer current regulation improvements over prior art drivers, which have exhibited or produced board-to-board output current variations that are unacceptably high for various applications. The wide range of board-to-board (or unit-to-unit) current variation, which driver circuit 400 is able to overcome, has been due to the rather poor performance of the prior art driver controllers, e.g., a HV9910, with regards to the current-sense pull-in threshold voltage Vcs(hi), e.g., 225 to 275mv, which can produce a corresponding current variation between 314 mA and 384 mA for a nominal design current of 350 mA and the full range in the controller datasheet was allowed.

As stated previously, such a wide range in delivered current can be unacceptable or undesirable for many load applications, e.g., series configurations of high-efficiency LEDs. The inclusion/addition of the external comparator 420 and reference/regulator 430 provides much better accuracy compared to prior art techniques, the offset voltage of comparator 420 (e.g., a TL331) being at or about 5 mV and the accuracy of the reference/regulator (e.g., TL431) being at or about 2%. Consequently, use driver circuit 400 can provide, among other things, a reduction of current variability from plus or minus 20% in prior art techniques to plus or minus 3-4%, e.g., an accuracy within 2% of a nominal value. Such uniformity of current, particularly at relatively high voltages, e.g., at or over 400 V, can be especially desirable for electrical loads including lighting elements such as LEDs for purposes of longevity.

Figure 5A:
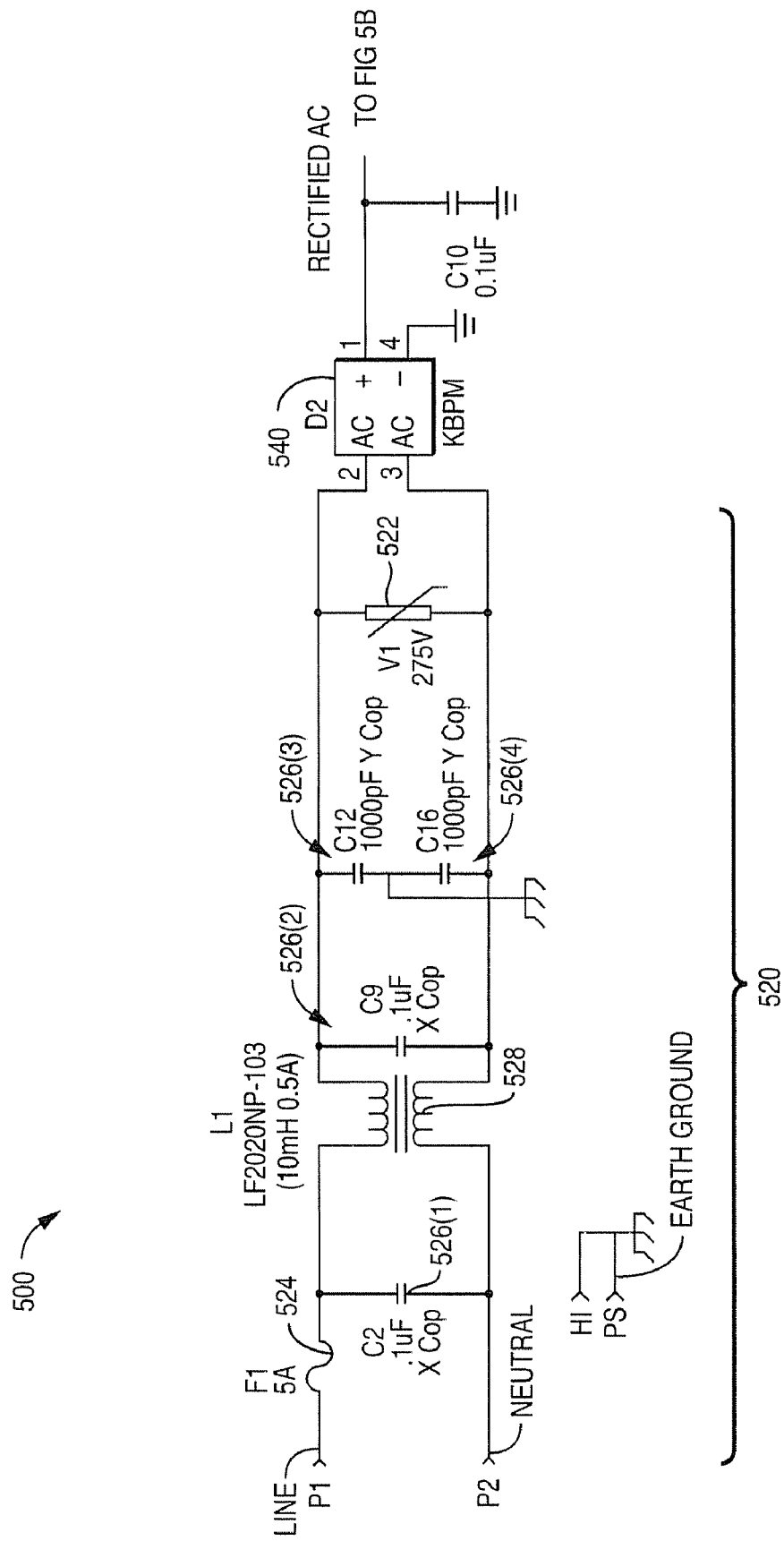
FIGS. 5A-B depict a circuit diagram of a PFC circuit, in accordance with a further embodiment of the present disclosure.
Figure 5B:
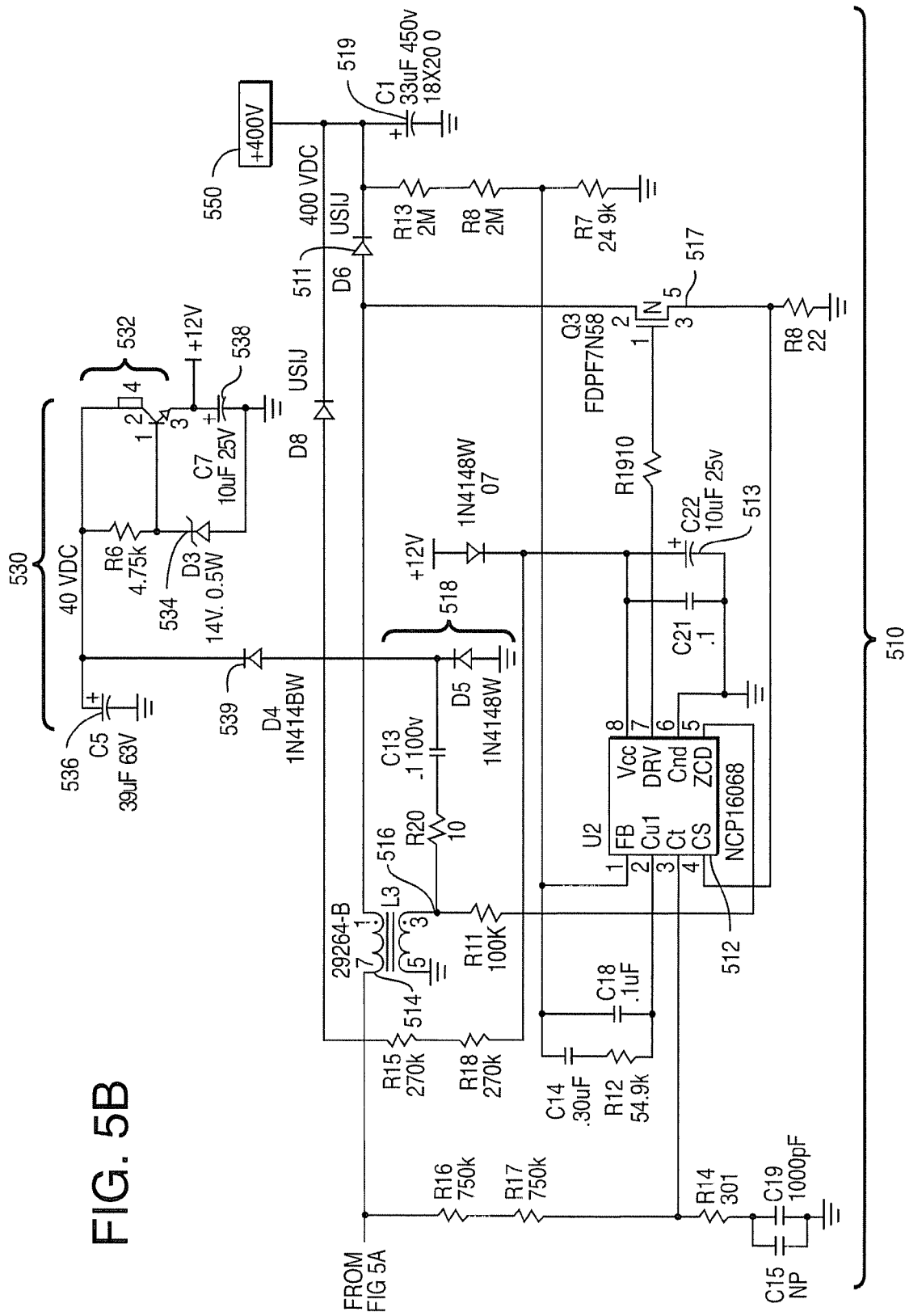

FIGS. 5A-B depict a circuit diagram of a PFC stage 500, in accordance with a further embodiment of the present disclosure. PFC stage 500 is generally similar to PFC stage 300 described for FIGS. 3A-B, and can include a boost circuit 510 (e.g., configured in a boost preconverter topology or circuit portion) connected to a EMI filter portion 520. The EMI filter 520 can be configured to receive AC power, such as supplied by a typical 120 Volt AC source with a line, neutral, and earth ground, as shown. The boost circuit 510 can include an active power factor correction controller 512. The stage 500 can also include a power regulator circuit 530 and a rectifier 540. In exemplary applications and implementations, the PFC stage 500 can be configured for operation in critical conduction mode (CRM).

The boost circuit 510 can also include a boost coil 514 with an auxiliary winding 516. A voltage regulation circuit or regulator 530 may be included in the PFC stage 500 so as to regulate voltage from the auxiliary winding 516 to a desired voltage for use by the power factor controller 512 and/or other circuitry/components, e.g., driver controller 612 as described infra for FIG. 6). In exemplary embodiments, PFC coil 514 can be a Z9264-B Flyback Transformer as made commercially available by Coilcraft, Inc.

With continued reference to FIGS. 5A-B, a rectifier 540 can be included in PFC stage 500 and may configured and arranged as shown to receive AC from the EMI filter circuit 520, for facilitating/producing and a rectified voltage and current for the boost circuit 510. In exemplary embodiments, a NCP1606B controller as made commercially available by ON Semiconductor may be used for power factor correction controller 512. The maximum voltage applied to any pin of a NCP1606 controller can be limited to 20V or less for certain applications.

As shown in FIG. 5A, the EMI filter circuit 520 can include a varistor 522, fuse 524, multiple capacitors 526(1)-526(4), and one or more coils/inductors 528 for EMI shielding/filtering of the line power.

Also as shown in FIG. 5B, the voltage regulator circuit (or regulator) 530 can include a common emitter amplifier 532, a Zener diode 534, a storage capacitor 536, and a local capacitor 538, which can be connected to the auxiliary winding 516 of the PFC coil 514, e.g., by way of a diode 539 and the charge pump 518. The common emitter amplifier 532 can include a NPN transistor, as shown. In exemplary embodiments, the NPN transistor can be a BCP56 model number transistor with a rating of 80 $V_{CEMAX}$, the storage capacitor 536 can be a 39 µF electrolytic capacitor rated for 63 V, and the local capacitor 338 can be a 10 µF capacitor rated for 25 V.

Figure 6:
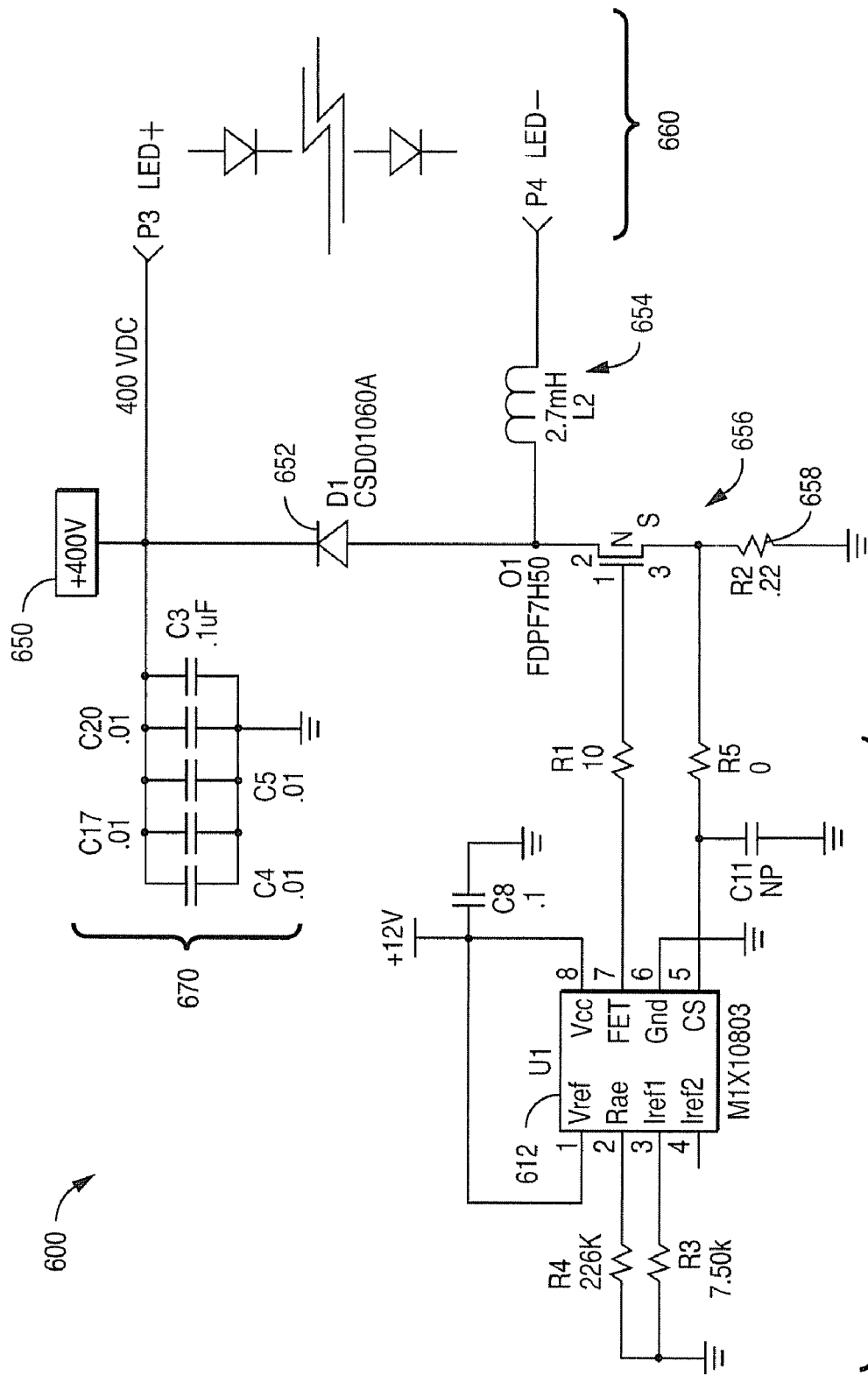
FIG. 6 depicts a circuit diagram of a driver circuit, in accordance with a further embodiment of the present disclosure.

FIG. 6 depicts a circuit diagram of a driver stage 600, in accordance with an embodiment of the present disclosure. Driver stage 600 can include a driver control topology or circuit 610. The driver stage 600 may be configured and arranged to regulate power received at an input 650 for application to an electrical load 660. The voltage at the input 450 may at a relative high voltage, e.g., at or above 400 V DC, or over a range of such voltages, e.g., from about 400 V DC to about 500 V DC, etc. In exemplary embodiments, the driver stage 600 can be coupled to an electrical load that includes a series configuration of LEDs, such as indicated in FIG. 6. The driver stage 600 may also include a capacitor bank 670 as shown. Circuit 600 is configured so current provided by the PFC supply 650 (e.g., supplying 400 V DC) can flow through the load 660 (e.g., strings of LEDs) and then thru the inductor 654, switch 656, and resistor 658 to ground.

The driver control circuit 610 can include a driver IC or controller 612. Applications of driver circuit 600 can utilize a general purpose LED driver control IC for controller 612. In exemplary embodiments, a MLX10803 LED driver IC as made commercially available by Melexis Microelectronic Integrated System may be used for driver controller 612. The driver controller is configured and arranged to control transistor switch 656. In exemplary embodiments, switch 656 is a 550 V N-Channel enhancement mode MOSFET FDPF7N50 as made commercially available by Fairchild Semiconductor Corporation.

With continued reference to FIG. 6, the driver stage 400 can include a flyback diode 652, e.g., as shown configured between input 650 and the drain of MOSFET switch 656. When controller 612 turns on MOSFET 656, current flows through LED load 660 and inductor 654. When controller 612 turns off MOSFET 656, the energy stored in the inductor 654 during the on time causes current to continue to flow in the load 660 and inductor 654. This current forward biases flyback diode 652 closing the loop. In exemplary embodiments, the diode 652 can be a silicon carbide (SiC) Schottky diode, e.g., a CSD01060A as made commercially available by Cree, Inc. Such configurations can facilitate longevity of the device(s)/component(s) forming the load for driver 600.

In exemplary embodiment, stage 600 is configured to receive an input voltage of about 400 V DC, e.g., as supplied by PFC stage 500 of FIGS. 5A-B, and may be used for supplying regulated power to desired electrical loads. Stage 600 may operate at 100KHz at 0.425 Amps in exemplary embodiments. In exemplary embodiments, driver stage 600 may be utilized to supply current to series configurations of LEDs. Moreover, in exemplary embodiments, driver stage 600 can be implement together with PFC stage 500 or PFC stage 300 (or a similar PFC stage). Such combined configuration can represent or provide a power supply suitable for targeted/intended electrical loads, e.g., including but not limited to series configuration of LEDs; exemplary embodiments can include a PFC stage implemented with a driver stage on a common circuit board, e.g., on opposing sides of the circuit board.

As described previously, embodiments according to the present disclosure can be utilized for application of relatively high-voltage (e.g., 400+V DC) power to series configurations of LEDs (or other light sources), which are used in many industries and for many applications. Such LEDs commonly require an applied voltage of between 2.5 and 4.5 V. LEDs can be of any kind, color (e.g., emitting any color or white light or mixture of colors and white light as the intended lighting arrangement requires) and luminance capacity or intensity, preferably in the visible spectrum. LEDs can comprise any semiconductor configuration and material or combination (alloy) that produce the intended array of color or colors. The LEDs can have a refractive optic built-in with the LED or placed over the LED, or no refractive optic; and can alternatively, or also, have a surrounding reflector that re-directs low-angle and mid-angle LED light outwardly.

In exemplary embodiments, a PFC stage (e.g., as shown and described for FIGS. 3A-B) and driver stage (e.g., as shown and described for FIGS. 4A-B) according to the present disclosure can be combined together to work as a power supply for one or more lighting elements. Such a combined power supply can also be implemented with one or more lighting elements to form a lighting apparatus or fixture.

In exemplary embodiments, one or more LEDs can be configured and arranged on a printed circuit board ("PCB"), which can include an onboard driver (e.g., as shown and described for FIGS. 4A-B) and/or PFC circuit (e.g., as shown and described for FIGS. 3A-B) to run the light sources, e.g., LEDs, with a desired current. For example, a current suitable for an LED may be used. For example, a representative current range could include, but is not limited to about 250 mA to about 800 mA; one exemplary current is about 350 mA. Such a circuit board can have a bus, e.g., a 24V DC bus, going from one end to the other. Other voltages may of course be used for a bus. Any suitable number of suitable LEDs an be disposed on a light strip board. In one illustrative example, one or more configurations of five (5) LEDs (LUXEON® Rebel LEDs as made commercially available by the Philips Lumileds Lighting Company) — operational at 80 Lumens minimum may be employed with the drivers and/or PFC circuits/stages of the present disclosure. Other suitable LEDs or alternative light sources and output values may be used within the scope of the present disclosure.

Accordingly, circuit embodiments according to the present disclosure can be used to provide relatively high DC voltages, e.g., at or over about 400 V DC, with improved PFC values. Moreover, embodiments of the present disclosure can provide driver circuits affording improved current regulation to electrical loads for such high voltages. Such techniques and embodiments according to the present disclosure can afford reduced wear, thermal fatigue, output variability, power consumption, as well as costs, when compared to prior art techniques. As described previously, embodiments of the present disclosure are particularly well-suited for use in supplying power to series configurations or strings of LEDs.

While certain embodiments have been described herein, it will be understood by one skilled in the art that the methods, systems, and apparatus of the present disclosure may be embodied in other specific forms without departing from the spirit thereof. For example, while aspects and embodiments herein have been described in the context of certain input or output voltages and currents, others may of course be realized and utilized within the scope of the present disclosure. Moreover, while embodiments of the present disclosure have been described in the context of supplying power to electrical loads consisting of series configurations of LEDs, the description of the electrical loads as LEDs has merely been by example, and the scope of the disclosure is not limited to such. It will be appreciated that the present disclosure can be used with virtually any type of electrical load.

Accordingly, the embodiments described herein, and as claimed in the attached claims, are to be considered in all respects as illustrative of the present disclosure and not restrictive.

What is claimed is:

1. A lighting apparatus driver circuit comprising:
a driver control circuit including a driver controller;
a comparator circuit including a comparator, wherein the comparator is connected to the driver control circuit;
a voltage regulator including a transistor connected to the comparator circuit; and
a diode configured to provide a return path for a current through an electrical load and inductor during the transistor switch off time;
wherein the driver circuit regulates the current supplied to the electrical load at a nominal current plus or minus about 2%.

2. The driver circuit of claim 1, wherein the voltage regulator comprises a shunt regulator.

3. The driver circuit of claim 1, wherein the comparator comprises a single differential comparator.

4. The driver circuit of claim 1, wherein the diode comprises a silicon carbide Schottky diode.

5. The driver circuit of claim 1, further comprising an input configured and arranged to received power with a voltage of about 400 V.

6. The driver circuit of claim 5, further comprising a capacitor bank configured between the input and ground.

7. The driver circuit of claim 1, wherein the comparator is connected to a current sensing input of the driver controller.

8. The driver circuit of claim 7, wherein the driver controller is a HV9910 controller.

9. A lighting power supply comprising:
(i) a PFC stage including:
an EMI filter configured to receive a AC input from an AC power supply;

a rectifier connecting the EMI filter portion, the rectifier being configured to receive AC power from the EMI filter and produce a rectified current;

a boost circuit connected to the rectifier and including a PFC controller and a PFC coil with an auxiliary winding, the boost circuit being configured to receive the rectified current and to produce a power factor corrected output with a higher voltage than the AC input of the AC power supply; and a voltage regulator connected to the auxiliary winding and including a common emitter amplifier portion including a common emitter amplifier transistor connected to the auxiliary winding, wherein the voltage regulator is configured to regulate a voltage supplied by the auxiliary winding to a desired voltage for application to the power factor correction controller; and (ii) a driver stage, configured and arranged to receive output from the PFC stage and supply as an output power to an electrical load, the driver stage including a driver controller, wherein the driver stage comprises a driver control circuit including a driver controller, a comparator circuit including a comparator, wherein the comparator is connected to the driver control circuit, a voltage regulator connected to the comparator circuit, and a diode configured to provide a return path for a current through an electrical load and inductor during the transistor switch off time;

wherein the driver control circuit regulates the current supplied to the electrical load at a nominal current plus or minus about 2%.

10. The power supply of claim 9, wherein the voltage regulator comprises a shunt regulator.

11. The power supply of claim 9, wherein the comparator comprises a single differential comparator.

12. The power supply of claim 9, wherein the diode comprises a silicon carbide Schottky diode.

13. The power supply of claim 9, further comprising an input configured and arranged to received power with a voltage of about 400 V.

14. The power supply of claim 13, further comprising a capacitor bank configured between the input and ground.

15. The power supply of claim 9, wherein the comparator is connected to a current sensing input of the driver controller.

16. The power supply of claim 15, wherein the driver controller is a HV9910 controller.

17. The power supply of claim 9, wherein the PFC stage and the driver stage are configured and arranged on a common circuit board.

18. The power supply of claim 9, wherein the boost portion comprises a charge pump.

19. The power supply of claim 9, wherein the boost portion is configured and arranged in a critical conduction mode topology.

20. The power supply of claim 9, wherein the voltage regulator further comprises a Zener diode connected to a base and an emitter of the common emitter amplifier transistor.

21. The power supply of claim 9, wherein the voltage regulator further comprises a diode coupled in series between the auxiliary winding and the common emitter amplifier transistor.

22. The supply of claim 21, wherein the voltage regulator further comprises a storage capacitor coupled between the diode and ground.

23. The power supply of claim 9, wherein the EMI filter is configured and arranged to receive a 120 V AC input and the boost circuit is configured and arranged to produce an output of about 400 V DC.

24. The power supply of claim 9, wherein the PFC controller is a NCP1606 controller.

* * * * *